3,778,431
GELATINIZABLE CROSSLINKED CATIONIC STARCH AND METHOD FOR ITS MANUFACTURE

Adrian P. Kightlinger, Edward K. Crosby, and Edwin L. Speakman, Clinton, Iowa, assignors to Standard Brands Incorporated, New York, N.Y.
No Drawing. Filed Oct. 16, 1972, Ser. No. 298,067
Int. Cl. C08b 19/06
U.S. Cl. 260—233.3 R
13 Claims

ABSTRACT OF THE DISCLOSURE

A gelatinizable crosslinked cationic starch especially suitable for paper sizing is produced by (1) reacting starch with an alkali-catalyzable crosslinking agent and the reaction product of the crosslinking agent with ammonia or with an amine and (2) depolymerizing the resultant cationic crosslinked product.

---

This invention relates to the preparation of cationically charged starch products. More particularly, the invention relates to gelatinizable crosslinked cationic starches, in which the starch is retained in its original granular form during the cationization and crosslinking of the starch, and to their preparation and application.

Cationic starches, or more correctly, cationic starch ethers, are old and well known in starch technology and have long been used principally in the manufacture of paper as wet end additives to increase wet web strength and pigment retention. Such cationic starches and their application in this manner are disclosed in U.S. patents issued to Caldwell, U.S. 2,917,506 and 2,935,436, Meisel, U.S. 3,017,294, Kirby, U.S. 3,336,292, Shildneck et al., U.S. 3,346,563, Patel et al., U.S. 3,378,457, Hunt, U.S. 3,624,070 and Paschall, U.S. 2,876,217. Such materials can also be used as flocculating agents to separate solids from aqueous suspensions thereof, e.g. in the treatment of ores, sewage and industrial waste waters, as is shown in Caldwell, U.S. 2,975,124 and Paschall, U.S. 2,995,513.

In addition to the foregoing applications, cationic starches have in recent years become recognized as ecologically important replacements for conventional starch products in paper sizes. More particularly, it has been found that in the reprocessing of broke and/or the recycling of starch-sized paper little of the cationic starch is lost to the white water during repulping operations. Consequently, the white water has desirably lower (50–75%) B.O.D. and C.O.D. levels.

Applicants' invention is, therefore, directed to a novel starch composition in which the starch molecules have a strong cationic (positive) charge and have been coupled by means of a crosslinking agent. This combination of cationization and crosslinking followed by depolymerization yields a starch composition which possesses the following applicational advantages:

(1) high attraction to paper fibers;
(2) minimal starch removal during repulping;
(3) excellent clarity of filtrates from repulped broke;
(4) excellent viscosity stability; and
(5) little or no non-starch residue.

Previously published studies have stated that when reacting starch with the reaction product of a crosslinking agent and a nitrogenous compound, the excess crosslinking agent must be stripped from the reaction product prior to carrying out the reaction with starch. It has now been found that the presence of the excess crosslinking agent during the reaction with starch imparts excellent viscosity stability to the final starch composition. Previously an excessive amount of cationization was required to give the desired viscosity stability. The method claimed by this invention therefore allows for a more economical use of the reagents and also decreases the cost of making the cationization reagent itself since stripping of the crosslinking agent is not required. Also the process permits reacting all of the components "in situ" if desired, thus increasing the flexibility of the production of such starch compositions.

In general, applicants' invention may be characterized as being a granular, gelatinizable crosslinked cationic starch product prepared by first cationizing and crosslinking the starch and then depolymerizing the starch. More particularly, the product of the invention is produced by the sequential steps of (a) reacting an aqueous suspension of granular starch under nongelatinizing conditions with (1) an alkali-catalyzable cross-linking agent, and (2) the reaction product of said crosslinking agent with a nitrogenous compound selected from the group consisting of ammonia and $C_{2-12}$ secondary and tertiary amines having the structure,

in which $R_1$ is a monovalent radical selected from the group consisting of hydrogen, alkyl, substituted alkyl, cycloalkyl, aryl, alkaryl, and aralkyl, $R_2$ and $R_3$ are monovalent radicals independently selected from the group consisting of alkyl, substituted alkyl, cycloalkyl, aryl, alkaryl, and aralkyl, and $R_2$ and $R_3$ when taken together form with the N atom saturated heterocyclic rings selected form the group consisting of substituted and unsubstituted piperidine, piperazine and morpholine, the length of any acyclic alkyl group being no greater than 4 carbon atoms, the reaction mixture having a slurry alkalinity of from about 20 to about 65, the amount of crosslinking agent being sufficient to react essentially with all of the amine as well as with some of the starch and the amount of amine being sufficient to impart to the starch a degree of substitution of from about 0.001 to about 0.10; and (b) depolymerizing the cationic crosslinked reaction product of step (a) to an alkaline paste fluidity of from about 201 to 299. As used herein, the term "slurry alkalinity" means the ml. of 0.1 N HCl required to neutralize 30 ml. of slurry using phenolphthalein indicator.

A wide variety of starches may be utilized in the process of the invention so long as they are granular in character. Thus, the term "starch" includes both root and cereal starches, e.g. corn, potato, tapioca, wheat, waxy sorghum, waxy maize, grain sorghum, rice, whether unmodified (raw) or modified as by oxidation, acid treatment and the like. However, it will normally be preferred to use unmodified granular starches since they are more economical.

As used herein, the term "crosslinking agent" and "coupling agent" refer to polyfunctional organic compounds which are reactive with both the starch hydroxyl groups and the foregoing described amines under aqueous alkaline conditions.

Such crosslinking agents include compounds having the structure A–B–A', wherein A is a functional group reactive with starch selected from the group consisting of epoxy, halogen, vinyl, allyl and acid halide, A' is a functional group reactive with both the starch and with the amine and which is halogen when the amine is tertiary or is selected from the group consisting of epoxy, halogen, vinyl, allyl, imine, isocyanate and acid halide when the amine is other than tertiary or quaternary. A and A' are not reactive with each other under the alkaline reaction conditions used herein. Group B is a divalent radical selected from the group consisting of —R— and

—R'—O—R"—, wherein R is a $C_1$ to $C_9$ substituted or unsubstituted hycarbyl group and R' and R" are $C_1$ to $C_4$ hydrocarbyl groups.

Suitable crosslinking agents which have been found include 1,4-dichlorobutene-2, 1,3-dichloro-2-propanol (glycerol dichlorohydrin), 1,2-epoxy-4-chlorobutane, 1,2-epoxy-3-chloropropane (epichlorohydrin), epibromohydrin, β,β'-dichlorodiethyl ether, 1,4-pentadiene dioxide, 3,4-epoxy-1-butene, 4,5-epoxy-1-pentene, allyl bromide, ally glycidyl ether, 3-chloropropene (allyl chloride), 4-chloro-1-butene, 2-chloropropionyl chloride, vinylacetyl chloride, allylacetyl chloride, 1,4-pentadiene, divinyl ether, 1,5-hexadiene and 1,6-heptadiene. Of these, 1,3-dichloro-2-propanol, 1,4-dichlorobutene-2 and epichlorohydrin are preferred.

It is preferred that sufficient crosslinking agent be used to produce a cationic intermediate starch product which, prior to depolymerization, has a sedimentation value of from about 5 to about 80. A maximum sedimentation value of about 60 is preferred with a value of about 30 being especially preferred in many instances for an optimum degree of crosslinking.

By "sedimentation value" is meant the volume of sediment (in ml.) produced by cooking for one minute at 200° F. a 2 percent by weight dispersion of the cationic intermediate product in water and then allowing 100 ml. of the thusly cooked dispersion to stand undisturbed for a period of at least 18 hours. The amount of sedimentation is related directly to the gelatinizability of the intermediate product and inversely to the degree of cross-linking. Thus, a sedimentation value of 5 indicates a rather highly crosslinked material, whereas a sedimentation value of 80 is indicative of a fairly low degree of crosslinking.

The reaction of such crosslinking agents within the context of the invention is shown by the following depicted reactions in which epichlorohydrin and trimethylamine are used as the crosslinking agent and nitrogenous compound respectively:

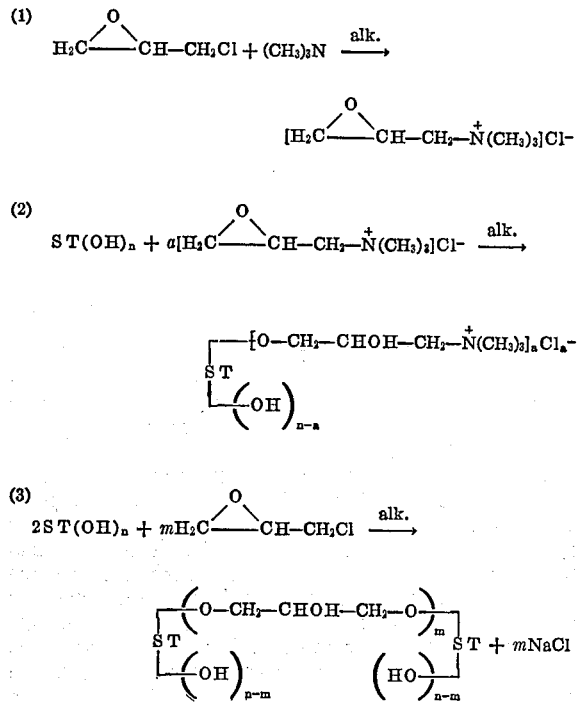

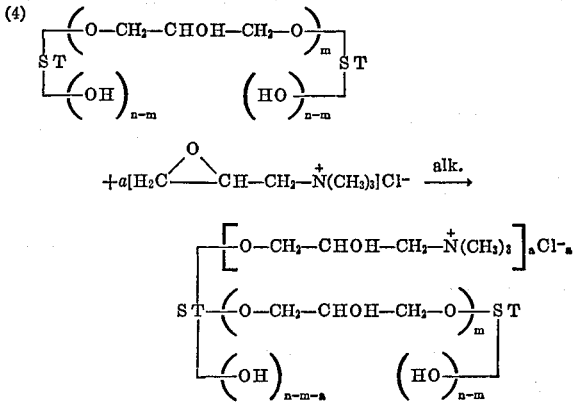

As used in the above-illustrated reaction mechanisms, the terms "m" and "a" do not infer the repetition of monomer units in a polymer chain, but the multiple random distribution of the indicated moieties along the starch molecule. The symbol "ST" denotes a starch molecule excluding its hydroxyl groups.

As will be shown in the examples herein below, the above-referred cationization and crosslinking of the starch can be carried out in a number of ways: (1) by first rendering the starch suspension alkaline and then admixing with the alkaline starch suspension a mixture of crosslinking agent and reaction product of the crosslinking agent with the amine; (2) by first rendering the starch suspension alkaline and the admixing therewith a mixture of crosslinking agent and amine; (3) by mixing the crosslinking agent and amine with the starch suspension in the absence of alkali and then rendering the admixture alkaline; or (4) by admixing with the starch suspension a mixture of crosslinking agent and reaction product of amine and crosslinking agent and then rendering the admixture alkaline.

While each of the sequences of carrying out the initial crosslinking and cationization of the starch are equivalent, nevertheless each may have an advantage in any particular situation. For example, if it is desired to obtain only a small degree of crosslinking (or subsequently, to depolymerize the crosslinked product to a lesser degree), it will generally be preferred to admix the reactants with the starch prior to rendering the reaction mixture alkaline. Also, in order to minimize losses by volatilization of certain amines, it may be preferred to complete reaction of the amine with the crosslinking agent prior to addition to the starch. It has been found that reaction efficiencies are in general higher if the alkaline catalysts is added to the starch suspension following the amine and crosslinking agent since this allows the amine and crosslinking agent to coreact without competition from the starch.

Suitable catalysts for the cationization steps of the process of the invention are strongly alkaline substances such as alkali metal hydroxides, alkaline earth metal hydroxides and quaternary ammonium bases, of which the alkali metal hydroxides, particularly sodium hydroxide, are preferred. The amount of alkaline catalyst should be within the range of from 0.01 to 0.1 mole of catalyst per mole of anhydroglucose unit (AGU), 0.01 to 0.08 mole/AGU being preferred.

Though the operable temperature of the cationization and crosslinking step may be as low as room temperature, it is nevertheless preferred to utilize an elevated temperature so long as it is below the gelatinization temperature of the starch. A reaction temperature of from 90–135° F. is preferred.

Especially when the process is conducted at elevated temperatures, it is preferred to conduct both the cationization/crosslinking and depolymerization steps in the presence of suitable concentrations of a gelatinization inhibitor in order to assure retention of the reaction product in the granular form. Saturated solutions of salts such as NaCl, Na₂SO₄ and MgSO₄ are useful for this purpose in which case alkaline catalyst concentrations as high as 0.2 mole per mole of anhydroglucose unit may be used without damage to the starch granule.

As is indicated hereinabove, a wide variety of amines may be used to render the starch cationic including ammonia and secondary and tertiary amines. The choice among these depends, inter alia, upon the degree of cationic charge which is desired as well as the reactivity of the amine with the crosslinking agent and the stability of that reaction product. Tertiary amines are preferred since both higher degrees of starch substitution as well as cationic charge are obtained thereby. Suitable amines are those containing 2 to 12 carbon atoms corresponding to the structure,

in which $R_1$ is a monovalent radical selected from the group consisting of hydrogen, alkyl, substituted alkyl, cycloalkyl, aryl, alkaryl, and aralkyl, $R_2$ and $R_3$ are monovalent radicals independently selected from the group consisting of alkyl, substituted alkyl, cycloalkyl, aryl, alkaryl, and aralkyl, and $R_2$ and $R_3$ when taken together form with the N atom saturated heterocyclic rings selected from the group consisting of substituted and unsubstituted piperidine, piperazine and morpholine, the length of any acrylic alkyl group being no greater than 4 carbon atoms.

Because of the crosslinking of the starch, which takes place in the initial step for making the product of the invention, the resultant product would not be readily gelatinizable and, depending upon the degree of crosslinking, might even be substantially incapable of gelatinization. Consequently, in order to retain adequate gelatinization capability, it is necessary to depolymerize the crosslinked starch. This thinning or degradation of the crosslinked starch may be accomplished by any of the methods well known in the art such as acid modification, oxidation, dextrinization and the like. Interestingly enough, it appears that the crosslinked starch depolymerizes in the same manner as untreated starch in that the basic starch chains are broken, not the crosslinking bonds. As a result of this unexpected phenomenon, the resultant depolymerized product exhibits not only good gelatinization characteristics, but also excellent viscosity stability, i.e. resistance to setback. Such resistance to viscosity increase on standing following depolymerization is quite surprising since ordinary, non-crosslinked, modified starches usually exhibit substantially tendency toward setback unless specifically treated to eliminate that tendency, e.g., by the addition of fatty acid soaps or by further derivatization.

The amount of depolymerization to be accomplished is determined by the product viscosity desired as well as by the extent of crosslinking. For a given level of desired viscosity, the amount of depolymerization is then related directly to the extent of crosslinking undergone by the starch in the first step of the process by which the starch is crosslinked and rendered cationic.

The invention will be more completely understood by reference to the following examples:

EXAMPLE I

This example illustrates preparation of the product of the invention in which the alkaline catalyst is added to the reaction mixture prior to the amine and crosslinking agent.

Twenty-three hundred grams of dry substance untreated corn starch were suspended in 3600 ml. of water. To this slurry were added 500 ml. of a caustic-salt solution containing 6.5 g. NaOH and 25.6 g. NaCl per 100 ml. of solution and heating of the slurry was initiated. At 124° F., 184 g. of a 25 percent by weight trimethylamine solution and 63.3 g. of epichlorohydrin were added to the reaction slurry. The slurry was held at 130° F. under constant agitation for 21 hours. The slurry was acidified in preparation for depolymerization by adding 150 ml. of 20° Bé. muriatic acid. The filtrate was 0.22 normal in acid. Depolymerization by acid modification proceeded for 17 hours at 130° F. The slurry was neutralized to pH 4.0 with sodium carbonate solution. The starch was recovered on a vacuum filter and washed to a low salt condition. The product cake was dried at 200° F. in a tray drier. The finished cationic product had a nitrogen content of 0.169 percent and an alkaline paste fluidity of 274. The product gelatinized readily upon being heated in water.

In the conduct of the above example a distinct odor was given off from the reaction mixture because of volatilization of the amine. The following example therefore illustrates a preferred method of conducting the reaction by which that problem is virtually eliminated.

EXAMPLE II

Twenty-three hundred grams dry substance untreated corn starch were suspended in 3600 ml. of water. To this slurry were added 184 g. of 25 percent by weight trimethylamine solution and 63.3 g. of epichlorohydrin. One hour later, heating of the slurry was started while 500 ml. of a caustic-salt solution containing 6.6 g. NaOH and 25.6 g. NaCl per 100 ml. of solution was added. When the slurry temperature reached 130° F., it was held there for 8 hours while the slurry was kept under constant agitation. In preparation for depolymerization, the slurry was acidified by adding 160 ml. of 20° Bé. muriatic acid. The filtrate was 0.20 normal in acid. Depolymerization by acid modification proceeded for approximately 15½ hours at 129° F. The slurry was neutralized to pH 4.80 with sodium carbonate solution. The starch was recovered on a vacuum filter and washed to a low salt condition. The finished cationic product had a nitrogen content of 0.199 percent, an alkaline paste fluidity of 257 and was readily gelatinized upon being heated in water.

This particular procedure offers several advantages over that used in Example I.

(1) The amount of crosslinking is reduced considerably since the amine and crosslinking agent are allowed to react for approximately one hour before the alkaline catalyst is added. After the alkaline catalyst is added, the starch begins to compete with the amine for the crosslinking agent (epihalohydrin).

(2) Since there is less crosslinking, the starch is more easily degraded.

(3) The reaction efficiency (based on nitrogen analysis) is considerably higher than that of Example I. Reaction efficiencies using the procedure of Example I have ranged from 27 to 37 percent while reaction efficiencies using the procedure of Example II have ranged from 44 to 53 percent.

(4) Loss of solubles using the preferred method of preparation is reduced from 8 to 9 percent by weight to 4 to 6 percent.

All of the procedures described herein produce products which are extremely low in non-starch residue. Starch pastes made in accordance with these procedures when diluted from 10 percent by weight solids to 6 percent or 3 precent solids in an Imhoff cone contain less than 0.1 ml. of residue in the bottom of the cone.

EXAMPLE III

This example differs from Example II in that the alkaline catalyst is added prior to the amine and crosslinking agent and differs from Example I in that heating of the starch dispersion was not started until after addition of reagents.

Twenty-three hundred grams of dry substance untreated corn starch were suspended in 3600 ml. water. To this slurry were added 500 ml. of a caustic-salt solution containing 6.6 g. NaOH and 25.6 g. NaCl per 100 ml. of solution. Then 184 g. of a 25 percent trimethylamine solution and 63.3 g. epichlorohydrin were added. One hour later, heating of the slurry was started and after 80 minutes the slurry temperature was 128° F. The slurry was maintained at this temperature under constant agitation for 20 hours after which the slurry was acidified for depolymerization by adding 145 ml. of 20° Bé. muriatic acid. The filtrate was 0.175 normal in acid. Acid modification proceeded for 18 hours at 128° F. The slurry was neutralized to pH 5.0 with sodium carbonate solution. The starch was recovered on a vacuum filter and washed to a low salt content. The product cake was dried at 200° F. in the lab Proctor and Schwartz drier. The finished granular cationic product had a nitrogen content of 0.187 percent and an alkaline paste fluidity of 259. As in the previous examples, the product was readily gelatinized in hot water.

EXAMPLE IV

This example illustrates the preparation of the reaction product of epichlorohydrin and trimethylamine (TMA) prior to its addition to the starch slurry.

The crude reaction product was prepared by adding 68.8 g. of epichlorohydrin to 117 g. of TMS-HCl (60.7 percent active) over a one-hour period maintaining the reaction temperature between 94° to 100° F. When the epichlorohydrin addition was complete, the reaction mixture was heated to 140° F. and held there for 30 minutes prior to cooling to room temperature. Ninety-two grams of the crude reaction product were added to six liters of an aqueous starch slurry containing 2300 g. of untreated corn starch. The slurry was made alkaline with 65 g. of hydrated lime and the resulting reaction mixture was maintained at 113° to 117° F. for 12 hours. The product was depolymerized and then finished similarly to the procedure as set forth in Example II. The finished product had a nitrogen content of 0.146 percent and alkaline paste fluidity of 273.

The following example illustrates the use of triethylamine in place of trimethylamine.

EXAMPLE V

Twenty-three hundred grams dry substance untreated corn starch were suspended in 3600 ml. water. To this slurry were added 500 ml. of a caustic-salt solution containing 6.6 g. NaOH and 25.6 g. NaCl per 100 ml. of solution and heating of the slurry started. At 102° F., 46 g. triethylamine and 63.3 g. epichlorohydrin were added. The slurry was further heated to 129° F. and held at that temperature for 23 hours. Then the slurry was acidified by adding 150 ml. of 20° Bé. muriatic acid. The filtrate was 0.192 normal in acid. Acid modification to effect depolymerization proceeded for approximately 30 hours at which time the filtrate acidity was reduced to 0.083 normal in acid using sodium carbonate solution. Acid modification was then continued for approximately 18 hours, after which the slurry was neutralized to pH 5.0 with sodium carbonate solution. The starch was recovered on a vacuum filter and washed to a low salt condition. The product cake was dried at 200° F. in the lab Proctor and Schwartz drier. The final granular cationic product had a nitrogen content of 0.085 percent, an alkaline paste fluidity of 282, and was easily gelatinized.

EXAMPLE VI

The same process was used as set forth in Example III, but ammonia was used in place of amine. The final product had a nitrogen content of 0.017 percent and an alkaline paste fluidity of 260.

EXAMPLE VII

A series of crosslinked cationic intermediate starch products was prepared using the first step only of the procedure of Example I in order to observe the effectiveness of a number of different crosslinking agents using trimethylamine as the nitrogenous compound for cationization. Each of these intermediate reaction products was observed with respect to reaction efficiency, degree of substitution (D.S.), dye acceptance and crosslinking behavior.

As used herein, the term "reaction efficiency" refers to the weight ratio of nitrogen added to the cationized starch to the nitrogen content of the total amine reactant.

The term degree of substitution (D.S.) refers to the number of moles of nitrogen imparted to the starch per anhydroglucose unit (AGU), excluding any residual proteinaceous nitrogen contained in the starch. Thus, all nitrogen analyses herein have been adjusted to exclude native nitrogen in the starch. Nitrogen analyses were all performed by the standard Kjeldahl method.

Alkaline paste fluidity was determined by the basic procedure of Fetzer and Kirst as presented in Cereal Chemistry, vol. 36, No. 2 (March 1959), pp. 108–127.

Dye acceptance, which is an indication of the degree of cationization of the starch, was observed in the following manner:

To a water-filled 4 inch test tube is added one gram of cationic reaction product. The resulting aqueous starch dispersion is acidified to pH 5–7 with dilute HCl and 10 drops of anionic dye (Light Green, SF Yellowish, 0.1 g. dye per 100 ml. dye solution) are added to the dispersion. Upon centrifuging of the dispersion, the starch settles to the bottom of the test tube and the color of the supernatant is observed. When the supernatant fluid is colorless, complete dye acceptance is indicated.

The degree of crosslinking of the cationic intermediate products was determined by measuring the sedimentation value (S.V.) of each sample by the procedure described hereinabove.

TABLE I

| Sample designation | Crosslinking agent | Reaction | | | Crosslinking | |
|---|---|---|---|---|---|---|
| | | Temp. (°F.) | Efficiency (percent) | D.S. | Dye acceptance | Sediment volume, ml. | Supernatant quality |
| 1 | Acrolein | 143 | <1.0 | <0.001 | Fair | 9 | Very clear. |
| 2 | Allylchloride | 122 | 1.7 | <0.001 | Poor | 61 | Clear—some opalescence. |
| 3 | 1,4-dichlorobutene-2 | 130 | 27.2 | 0.011 | Good | 8 | Very clear. |
| 4 | Phosphorus oxychloride | 130 | 3.2 | 0.0013 | Very poor | 51 | Clear—some opalescence. |
| 5 | do | 135 | 5.6 | 0.002 | do | 61 | Clear—very slight opalescence. |
| 6 | 1,3-dichloro-2-propanol | 130 | 45.3 | 0.019 | Excellent | 18 | Clear. |

From the results given in Table I above, the cationic crosslinked intermediate products using acrolein, allylchloride and phosphorous oxychloride were each unsatisfactory in that they all had an inadequate degree of substitution. Likewise, they exhibited low reaction efficiencies as well as low dye acceptance.

However, the 1,4-dichlorobutene-2 and 1,3-dichloro-2-propanol crosslinked products exhibited intermediately low sedimentation, ergo substantial but not excessive crosslinking, and good or excellent dye acceptance and D.S., thus a substantial degree of cationization.

In view of the foregoing results, it is apparent that those crosslinking agents corresponding to the structure A–B–A', as defined hereinabove are operably preferred for the product of the invention.

EXAMPLE VIII

A series of crosslinked cationic intermediate starch products was prepared in accordance with the procedure of Example VII in order to observe the effectiveness of several secondary and tertiary amines, using epichlorohydrin as the crosslinking agent. As in Example VII, each product was observed with respect to reaction efficiency, degree of substitution, dye acceptance and crosslinking behavior.

The results were as follows:

TABLE II

| | | Reaction | | | | Crosslinking | |
|---|---|---|---|---|---|---|---|
| Sample designation: | Amine | Temp. (°F.) | Efficiency (percent) | D.S. | Dye acceptance | Sediment Volume, mo. | Supernatant quality |
| 7 | N-methylmorpholine | 128 | 47.1 | 0.021 | Excellent | 11 | Clear. |
| 8 | N,N-dimethyl dodecylamine | 128 | 37.6 | 0.017 | ....do | 8 | Very clear. |
| 9 | N,N-dimethyl bezylamine | 126 | 55.6 | 0.025 | ....do | 25 | Do. |
| 10 | N-methyl pyridine | 128 | 44.1 | 0.020 | ....do | 21 | Do. |
| 11 | Dimethylamine | 125 | 7.9 | 0.004 | Good | 42 | Clear—slight opalescence. |
| 12 | Dimethylamino ethanol | 128 | 11.8 | 0.005 | ....do | 7 | Clear. |
| 13 | Diethylamine | 126 | 33.5 | 0.015 | Excellent | 20 | Do. |
| 14 | Dibutylamine | 130 | 20.0 | 0.009 | Fair | 13 | Do. |

Each of the above-listed secondary and tertiary amines exhibited a quite satisfactory degree of cationic substitution and each of the products, using epichlorohydrin as the cross-linking agent, were desirably crosslinked to a moderately high extent.

The advantages of the granular cationic starch ether of the invention, in which the product is crosslinked and subsequently depolymerized, are shown by the following example in which the physical properties of the product of the invention are compared with a competitive cationic starch ether which had not been crosslinked and subsequently depolymerized.

EXAMPLE IX

In a first comparison, separate quantities of the product of the invention made in accordance with Example II and of the above-described competitive cationic starch were dispersed in water to a solids level of 10% by weight and cooked at 200° F. for 20 minutes. Brookfield viscosities were run immediately on each of the dispersions at five temperatures from 170° F. to 90° F., following which both cooked dispersions were stored for 24 hours at 80° F. and the Brookfield viscosity of each was again determined. The results are given in Table III below.

TABLE III

Comparative viscosity characteristics of 10% by weight dispersions (Brookfield viscosity, 20 r.p.m. #1 spindle)

| Temperature (°F.) | Invention cationic starch, viscosity, cps. | Competitive cationic starch, viscosity, cps. |
|---|---|---|
| 170 | 37 | 20 |
| 150 | 78 | 35 |
| 130 | 149 | 55 |
| 110 | 188 | 105 |
| 90 | 323 | 1,000 |
| 80[1] | 1,300 | 13,400 |

[1] After 24 hours.

The above data show quite graphically that the cationic crosslinked starch of the invention thickens much less severely than the competitive cationic starch which had not been crosslinked and subsequently depolymerized. The comparison is even more startling in the case of the stored viscosity measurements which showed that the competitive sample underwent over a thirteen-fold increase in viscosity while the cationic starch per the invention increased only about four-fold. Thus, the product of the invention can be seen to possess outstanding viscosity stability both upon cooling as well as upon prolonged storage, which properties are of great importance in the handling of the products in commercial-scale applications.

The ecological benefits of the products of the invention when used as a surface size can be observed by the following example.

EXAMPLE X

In this test, the product of the invention made in accordance with Example II and an ordinary enzyme converted starch typical of those used by the paper industry were separately used to size paper in the usual manner, after which measured quantities of the sized paper stock were repulped in a Waring Blender. The resulting pulp was filtered through #4 Whatman filter paper and the filtrate, which is analogous to the white water effluent of a paper mill, was examined as to starch content, biochemical and chemical oxidation demand (B.O.D. and C.O.D.) and turbidity. The results were as follows:

TABLE IV.—FILTRATE ANALYSIS OF REPULPED BROKE

| Coating | Enzyme converting starch | Product of the invention |
|---|---|---|
| Starch content, mg./liter | 230 | 20 |
| B.O.D | 108 | 25 |
| C.O.D | 270 | 53 |
| Turbidity (Hellige) | 80 | 14 |

The above data show the remarkable potential for the use of cationic paper sizes to reduce the amount of contaminants going to paper mill effluent streams as the result of recycling sized papers. The cationic starch of the invention therefore reduces both the biological and chemical oxidation demand as well as turbidity of such streams.

What is claimed is:

1. A gelatinizable crosslinked cationic starch product prepared by the sequential steps of:

(a) reacting an aqueous suspension of granular starch under non-gelatinizing conditions with (1) an alkali-catalyzable polyfunctional organic crosslinking agent the functional moieties of which are reactive with starch hydroxyl groups, ammonia, and secondary and tertiary amine groups under aqueous alkaline conditions and (2) the reaction product of said crosslinking agent with a nitrogenous compound selected from the group consisting of ammonia and $C_{2-12}$ secondary and tertiary amines having the structure,

in which $R_1$ is a monovalent radical selected from the group consisting of hydrogen, alkyl, substituted alkyl, cycloalkyl, aryl, alkaryl, and aralkyl, $R_2$ and $R_3$ are monovalent radicals independently selected from the group consisting of alkyl, substituted alkyl, cycloalkyl, aryl, alkaryl, and aralkyl, and $R_2$ and $R_3$ when taken together form with the N atom saturated heterocyclic rings selected from the group consisting of substituted and unsubstituted piperidine, piperazine and morpholine, the length of any acyclic alkyl group being no greater than 4 carbon atoms, the reaction mixture having a slurry alkalinity of from about 20 to about 65, the amount of crosslinking agent being sufficient to impart to the starch a sedimentation value of from about 5 to about 80, and the amount of amine being sufficient to impart to the starch a degree of cationic substitution of from about 0.001 to about 0.10; and (b) depolymerizing the cationic crosslinked reaction product of step (a) to an alkaline paste fluidity of from about 201 to 299.

2. The cationic starch product of claim 1, in which the reaction mixture is prepared by first rendering the starch suspension alkaline and then admixing therewith a mixture of the crosslinking agent and reaction product of the crosslinking agent with the amine.

3. The cationic starch product of claim 1, in which the reaction product is prepared by first rendering the starch suspension alkaline and then admixing therewith the crosslinking agent and amine.

4. The cationic starch product of claim 1, in which the reaction mixture is prepared by first admixing crosslinking agent and amine with the starch suspension in the absence of alkali and then rendering the admixture alkaline.

5. The cationic starch product of claim 1, in which the reaction mixture is prepared by first admixing with the starch suspension a mixture of the crosslinking agent and reaction product of the crosslinking agent with the amine in the absence of alkali and then rendering the admixture alkaline.

6. The cationic starch product of claim 1 in which the crosslinking agent conforms to the configuration A–B–A′ wherein A and A′ are functional moieties reactive with both the nitrogenous compound and the hydroxyl groups of the granular starch under alkaline conditions and B is a divalent radical selected from the group consisting of —R— and —R′—O—R″—, wherein R is a $C_{1-9}$ hydrocarbyl group and R′ and R″ are $C_{1-4}$ hydrocarbyl groups.

7. The cationic starch product of claim 6 in which the functional moieties are selected from the group consisting of halogen and, when the aforesaid nitrogenous compound is other than a tertiary or quaternary amine, allyl, halogen, vinyl, acid halide, epoxy, imine and isocyanate.

8. The cationic starch product of claim 7 in which the crosslinking agent is epichlorohydrin.

9. The cationic starch product of claim 7 in which the crosslinking agent is 1,4-dichlorobutene-2.

10. The cationic starch product of claim 7 in which the crosslinking agent is 1,3-dichloro-2-propanol.

11. The cationic starch product of claim 6 in which the nitrogenous compound is trimethylamine.

12. The cationic starch product of claim 6 in which the nitrogenous compound is diethylamine.

13. A method for the manufacture of a gelatinizable crosslinked cationic starch product comprising the sequential steps of:

(a) reacting an aqueous suspension of granular starch under non-gelatinzing conditions with (1) an alkali-catalyzable polyfunctional organic crosslinking agent the functional moieties of which are reactive with starch hydroxyl groups, ammonia and secondary and tertiary amine groups under aqueous alkaline conditions and (2) the reaction product of said crosslinking agent with a nitrogenous compound selected from the group consisting of ammonia and $C_{2-12}$ secondary and tertiary amines having the structure,

in which $R_1$ is a monovalent radical selected from the group consisting of hydrogen, alkyl, substituted alkyl, cycloalkyl, aryl, alkaryl, and aralkyl, $R_2$ and $R_3$ are monovalent radicals independently selected from the group consisting of alkyl, substituted alkyl, cycloalkyl, aryl, alkaryl, and aralkyl, and $R_2$ and $R_3$ when taken together form with the N atom saturated heterocyclic rings selected from the group consisting of substituted and unsubstituted piperidine, piperazine and morpholine, the length of any acyclic alkyl group being no greater than 4 carbon atoms, the reaction mixture having a slurry alkalinity of from about 20 to about 65, the amount of crosslinking agent being sufficient to impart to the starch a sedimentation value of from about 5 to about 80, and the amount of amine being sufficient to impart to the starch a degree of cationic substitution of from about 0.001 to about 0.10; and (b) depolymerizing the cationic crosslinked reaction product of step (a) to an alkaline paste fluidity of from about 201 to 299.

References Cited
UNITED STATES PATENTS

| | | | |
|---|---|---|---|
| 2,876,217 | 3/1959 | Paschall | 260—233.3 |
| 2,995,513 | 8/1961 | Paschall et al. | 210—54 |
| 3,649,624 | 3/1972 | Powers et al. | 260—233.3 R |
| 3,654,263 | 4/1972 | Cescato | 260—233.3 R |
| 3,666,751 | 5/1972 | Jarowenko et al. | 260—233.3 R |

DONALD E. CZAJA, Primary Examiner

M. I. MARQUIS, Assistant Examiner

U.S. Cl. X.R.

117—143 A; 260—17.3, 233.3 A, 233.5

UNITED STATES PATENT OFFICE
CERTIFICATE OF CORRECTION

Patent No. 3,778,431         Dated December 11, 1973

Inventor(s) Adrian P. Kightlinger et al.

It is certified that error appears in the above-identified patent and that said Letters Patent are hereby corrected as shown below:

1) Column 1, line 36; "Patel et al., U.S. 3,378,457" should read --Patel et al., U.S. 3,378,547--.

2) Column 3, sentence bridging lines 7 and 8; "hycarbyl" should read --hydrocarbyl--.

3) Column 3, line 24; sentence bridging lines 25 and 26; lines 29 and 37; sentence bridging lines 38 and 39; "sedimentation value" should read --Sedimentation Value--.

4) Column 3, line 36; hyphen should not appear in "cross-linking".

5) Column 4, line 32; before "admixing" the word "the" should read --then--.

6) Column 4, line 52; "catalysts" should read -- catalyst --.

7) Column 5, line 30; "acrylic" should read --acyclic--.

8) Column 5, line 51; "substantially" should read --substantial--.

9) Column 5, line 73; "6.5 g. NaOH" should read --6.6 g. NaOH--.

10) Column 6, line 63; "cone" should read --Cone--.

11) Column 7, line 24; "TMS-HCL" should read --TMA-HCL--.

UNITED STATES PATENT OFFICE
CERTIFICATE OF CORRECTION

Patent No. 3,778,431　　　　　　　　Dated　December 11, 1973

Inventor(s) Adrian P. Kightlinger et al.　　　　Page 2

It is certified that error appears in the above-identified patent and that said Letters Patent are hereby corrected as shown below:

12) Columns 7 and 8; Table I; under column headed "Temp. (°F)" opposite "Sample designation 5", "135" should read --125--.

13) Columns 9 and 10, Table II; under column headed "Amine" opposite "Sample designation 9", "bezylamine" should read --benzylamine--; Column heading "Sediment Volume, mo." should read --Sediment Volume, ml--.

14) Column 11, line 1; column 12, sentence bridging lines 29 and 30; "sedimentation value" should read --Sedimentation Value--.

15) Column 12, line 4; "non-gelatinzing" should read --non-gelatinizing--.

Signed and sealed this 2nd day of July 1974.

(SEAL)
Attest:

EDWARD M. FLETCHER, JR.　　　　　C. MARSHALL DANN
Attesting Officer　　　　　　　　Commissioner of Patents